United States Patent
Glass

(10) Patent No.: US 8,253,265 B2
(45) Date of Patent: Aug. 28, 2012

(54) POWER-AUGMENTING SHROUD FOR ENERGY-PRODUCING TURBINES

(75) Inventor: Ben Glass, Ann Arbor, MI (US)

(73) Assignee: Altaeros Energies, Inc., Boston, MA (US)

( * ) Notice: Subject to any disclaimer, the term of this patent is extended or adjusted under 35 U.S.C. 154(b) by 296 days.

(21) Appl. No.: 12/579,839

(22) Filed: Oct. 15, 2009

(65) Prior Publication Data

US 2010/0090473 A1    Apr. 15, 2010

Related U.S. Application Data

(60) Provisional application No. 61/105,509, filed on Oct. 15, 2008.

(51) Int. Cl.
*F03D 9/00* (2006.01)
(52) U.S. Cl. .............................. 290/55; 290/44
(58) Field of Classification Search ............ 290/55, 290/44; 415/2.1, 7, 4.3, 4.5
See application file for complete search history.

(56) References Cited

U.S. PATENT DOCUMENTS

| | | | |
|---|---|---|---|
| 4,165,468 A | 8/1979 | Fry et al. | |
| 4,166,596 A | 9/1979 | Mouton, Jr. et al. | |
| 4,207,026 A | 6/1980 | Kushto | |
| 4,309,006 A | 1/1982 | Biscomb | |
| 4,350,897 A * | 9/1982 | Benoit | 290/55 |
| 4,350,898 A * | 9/1982 | Benoit | 290/55 |
| 4,350,899 A * | 9/1982 | Benoit | 290/55 |
| 4,450,364 A * | 5/1984 | Benoit | 290/55 |
| 4,789,302 A * | 12/1988 | Gruzling | 415/221 |
| 4,832,571 A | 5/1989 | Carrol | |
| 5,836,738 A | 11/1998 | Finney | |
| 6,382,904 B1 | 5/2002 | Orlov et al. | |
| 7,335,000 B2 | 2/2008 | Ferguson | |
| 7,582,981 B1 * | 9/2009 | Meller | 290/44 |
| 2007/0013196 A1 * | 1/2007 | Chen | 290/55 |
| 2008/0048453 A1 | 2/2008 | Amick | |
| 2010/0032947 A1 * | 2/2010 | Bevirt | 290/44 |

FOREIGN PATENT DOCUMENTS

| | | |
|---|---|---|
| EP | 0045202 | 2/1982 |
| EP | 0935068 | 8/1999 |

OTHER PUBLICATIONS

PCT International Search report; PCT Application No. PCT/US2009/060818.

* cited by examiner

*Primary Examiner* — Hae Moon Hyeon
(74) *Attorney, Agent, or Firm* — William A. Loginov, Esq.; Loginov & Associates, PLLC

(57) ABSTRACT

A shroud, such as for an airborne wind-turbine for converting wind energy into another form of energy, such as electrical energy. The shroud has a ring-like shape with an airfoil cross-section and defines an interior volume for containing a lighter-than-air gas. The shroud includes a central opening oriented along a longitudinal axis of the shroud. The shroud is configured to produce an asymmetric moment of left and right lateral sections thereof, which asymmetric moment yields a restoring moment that automatically orients the longitudinal axis of the shroud substantially optimally relative to a prevailing wind direction.

19 Claims, 6 Drawing Sheets

POWER-AUGMENTING SHROUD FOR ENERGY-PRODUCING TURBINES

CROSS-REFERENCE TO RELATED APPLICATIONS

This application is related to, and claims the benefit of priority from, U.S. Provisional Patent Application Ser. No. 61/105,509, filed 15 Oct. 2008, the disclosure of which application is incorporated herein by reference in its entirety.

FIELD OF THE INVENTION

A shroud, such as for an airborne wind-turbine for converting wind energy into another form of energy, the shroud configured to produce an asymmetric moment of left and right lateral sections thereof, which asymmetric moment yields a restoring moment that automatically orients the longitudinal axis of the shroud substantially optimally relative to a prevailing wind direction.

BACKGROUND

Though wind energy is increasingly popular, especially with the threat of global climate change, the cost of energy from wind farms is still not competitive with that of more conventional power sources. Additionally, most of the top-tier wind farm sites have already been taken, forcing new developments to move to less favorable environments which will make the large scale deployment of wind energy all but impossible with current technology.

Windmills in recent years have become more effective and competitive with other energy sources, but most still remain very expensive to install. As a result, their overall cost per installed kilowatt (kW) is still high enough that they are only marginally deployed and contribute only a small amount to the "electrical grid."

The primary configuration of modern windmills is a horizontally-mounted, large diameter, three-bladed propeller that rotates at low revolutions-per-minute (rpm's) over a very large swept area. The higher the rotational axis of the propeller can be mounted, the better, as the natural speed of the wind increases with an increase in the height above the ground. Conventional windmills thus have very tall and very strong tower structures. Typically, they have a tubular steel tower that is mounted to a deep, subterranean cement base. The system has to be very carefully engineered and sited appropriately for the surrounding terrain. The towers must maintain a central stairway or other means to allow construction and operator access to the upper mechanicals. The tower must accommodate the heavy gearbox, electrical turbine, and propeller assembly, as well as be strong enough to withstand gale force winds, and potentially earthquakes. To make the system even more complicated, the upper nacelle and gearbox/turbine housing must be able to pivot on a vertical axis, so as to align the propeller correctly with the wind direction at any time during the day or night. On many windmill systems the individual blades of the windmill are able to rotate about their individual longitudinal axis, for pitch control. They can optimize the pitch of the blades depending on the nominal wind speed conditions that are present at any one time at the site. They can also change the pitch of the blade to "feather" the propeller if the nominal wind speeds are too large. Occasionally the windmill is locked to prevent rotation, and the blades feathered to prevent major damage to the machine in a storm. All of this pitch control technology adds significantly to the cost of windmills.

Another major problem with conventional windmills is damage caused by lightning during thunderstorms. The blades can be upwards of 300 feet in the air and are a good source for lightning to find a conductive path to the ground. Some of the more recently designed windmills use a system of replaceable sacrificial lightning conduction attractors that are built into each windmill propeller blade. They help channel the lightning away from the vulnerable composite structure that comprises the blade itself. The fact remains that one of the major causes of windmill downtime and maintenance costs are caused by lightning damage.

The size of many windmills is also a major problem for inspection, diagnostics, and repair. Often workmen have to use ropes and climbing techniques to perform maintenance on the massive machines. It is very expensive and dangerous. In recent years workmen have fallen to their death trying to repair the blades.

There have been a number of proposals for more efficient and/or cost effective means of harvesting the wind's energy in order to combat the high price of wind energy. There has been considerable effort put into developing diffuser-augmented wind turbines, which have considerably higher power output for a given size rotor than conventional turbines. However, the cost of the diffuser has not justified their commercial implementation.

Some effort has also been made to develop high-altitude wind harvesters, as high-altitude winds are considerably stronger than ground level winds and are present almost everywhere. In one example of this effort, It has been proposed to provide tethered wind turbines that are deployed at or above ground level, the disclosure of Amick, US Published Application 20080048453, the disclosure of which is incorporated herein by reference in its entirety.

However, no conventional windmill yet addressees the foregoing problems while providing for cost-effective wind-energy production.

SUMMARY OF THE DISCLOSURE

The present invention addresses problems encountered in prior art apparatus, and encompasses other features and advantages, through the provision, in one embodiment, of a lighter-than-air shroud for an airborne wind-turbine for converting wind energy into another form of energy, the shroud having a ring-like shape having an airfoil cross-section and defining an interior volume for containing a lighter-than-air gas. The shroud includes a central opening oriented along a longitudinal axis of the shroud, and is further configured to produce an asymmetric moment of left and right lateral sections thereof, which asymmetric moment yields a restoring moment that automatically orients the longitudinal axis of the shroud substantially optimally relative to a prevailing wind direction.

BRIEF DESCRIPTION OF THE DRAWINGS

For a better understanding of the invention, and to show more clearly how it may be carried into effect according to one or more embodiments thereof, reference will now be made, by way of example, to the accompanying drawings, showing exemplary embodiments of the present invention and in which.

WRITTEN DESCRIPTION

Figure 1:
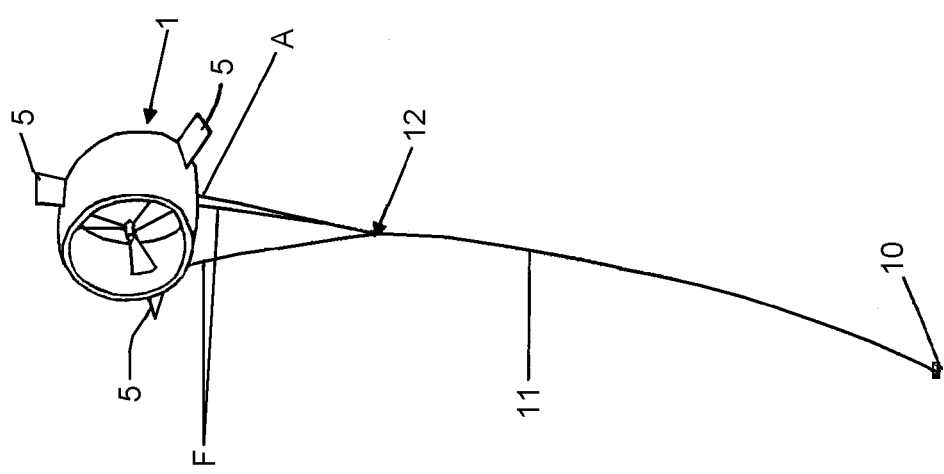
FIG. 1 depicts an exemplary wind-turbine system incorporating the inventive shroud.

As required, a detailed embodiment of the present invention is disclosed herein. However, it is to be understood that the disclosed embodiment is merely exemplary of the invention that may be embodied in various and alternative forms. Therefore, specific structural and functional details disclosed herein are not to be interpreted as limiting, but merely as a representative basis for teaching one skilled in the art to variously employ the present invention.

The accompanying drawings are not necessarily to scale, and some features may be exaggerated or minimized to show details of particular components.

Referring now to the drawings, wherein like numerals refer to like or corresponding parts throughout the several views, the present invention is generally characterized as a power augmenting shroud for an airborne wind-turbine for converting wind energy into energy (e.g., electrical energy), such as, for instance, an airborne wind-turbine of the type disclosed in Amick, US Published Application 20080048453.

Figure 2:
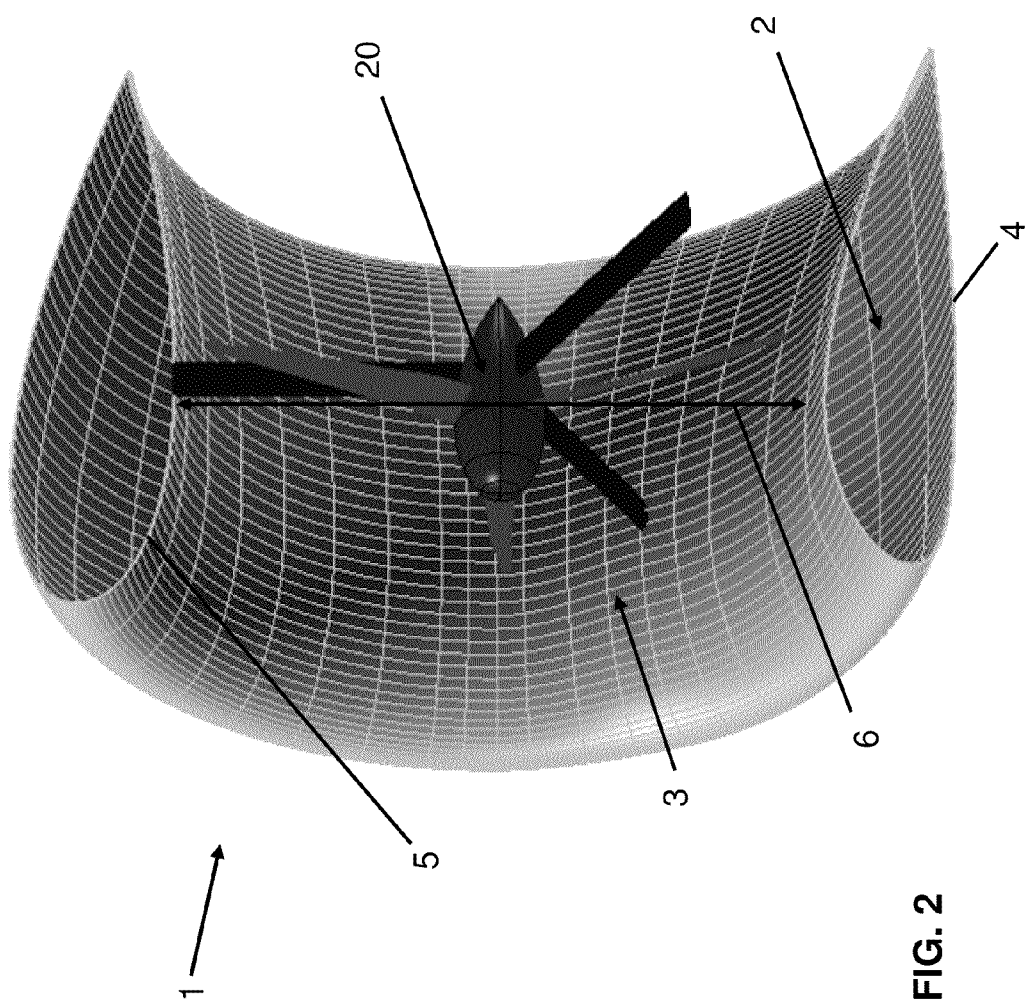
FIG. 2 is a cross-sectional view of an exemplary shroud according to the present invention.

The shroud 1 is a "lighter-than-air shroud," and so is dimensioned to define an internal volume 2 capable of holding a sufficient volume of lighter-than-air gas to provide buoyant lift for overcoming the weight of the airborne components of the wind turbine system comprising the "lighter-than-air shroud", enshrouded wind turbine and related components, and tether, and maintaining the enshrouded wind turbine at heights substantially above ground level where wind speeds are generally higher (see FIG. 2). To this end, the material of the shroud is preferably impermeable to egress of a suitable lighter-than-air gas contained therein, such as, by way of non-limiting example, helium, and is, furthermore, impermeable to ingress of outside air. According to the exemplary embodiment, fabrication and operation of the shroud may utilize materials, subsystems and processes such as those used in other "lighter-than-air" devices (e.g., aerostats). In the exemplary embodiment, means are also provided for maintaining the volume of lighter-than-air gas at acceptable pressure, and further for substantially maintaining the shape and size of the shroud, in varying atmospheric conditions. Such means may include, by way of non-limiting example, internal ballonets, subdividing the internal volume of the shroud to define multiple internal compartments, etc.

Referring to FIG. 1, the shroud 1, along with all other associated airborne components of the wind turbine system of which it is a part, can be lowered and raised from a base station 10 by means of a tether 11. Any conventional means, including such as disclosed in Amick, US Published Application 20080048453, can be employed to provide for the selective raising and lowering of the shroud 1 via the tether 11.

Once airborne, the tethered shroud 1 will passively float downwind of the base station. As wind direction changes, the drag force on the shroud 1 will, by virtue of its design as explained further herein, cause the shroud 1 to passively change its location with respect to the base station 10, thereby automatically maintaining a down-wind position with respect to the new wind direction.

Tether 11 is secured to shroud 1 at fore F and aft A attachment points so that the shroud's center of pressure is located downwind of the tether's fore F attachment points. Tether 11 is further attached to the shroud 1 at a location so that the aerodynamic forces on the shroud 1 passively restore the minimum radius section thereof to be oriented approximately normal to the direction of airflow. The passive stability and control of shroud 1 can, optionally, be further improved by moving the shroud's center of pressure aft through the employment of aft stabilizers, such as flat winglets or fins (not shown), on the exterior of shroud 1. Furthermore, the center of buoyancy and center of gravity of shroud 1 (taking into account the wind turbine components disposed therein) are both located between the fore F and aft A tether attachment points and as close to each other as possible.

While capable of employment at a variety of scales, it is contemplated that shroud 1 may be dimensioned to accommodate wind turbines with minimum rotor diameters of 15 or 20 meters.

Referring also to FIG. 2, the shroud 1 provides means for passively maintaining the wind turbine system of which it is part approximately aligned with the direction of wind at heights above ground level, while increasing the power output of the enshrouded wind turbine by increasing the upstream size of the captured stream tube 3 through aerodynamic diffusion of the airflow therethrough. To these ends, the shroud 1 is essentially characterized by a ring-like shape the cross-section of which is an airfoil shape with (except where the airfoil is symmetric) the high-pressure surface 4 oriented toward the shroud exterior and the low-pressure surface 5 oriented towards the shroud interior (the captured stream tube 3) with the chord oriented in the direction of airflow at a geometric angle of attack ($\alpha_{geometric}$) equal to or greater than zero. According to the exemplary embodiment, the airfoil sectional thickness is in the range of from approximately 12% to approximately 30%, while the chord/radius ratio is approximately 1-5.

It is contemplated that, optionally, shroud 1 may further comprise additional lift surfaces, such as wings 5, disposed on the exterior of shroud 1.

Still referring to FIG. 2, shroud 1 is further shaped such as to provide a circular section (denoted by line 6) of minimum radius approximately normal to the wind flow and a divergent section downstream (i.e., aft of the wind turbine 20) thereof. The enshrouded wind turbine 20 is placed such that the turbine blades sweep out this minimum radius circular section 6 as they rotate. It will be appreciated that the foregoing design passively augments the power conveyed through the enshrouded wind turbine by increasing the mass flow of air through the enshrouded wind turbine 20.

Figure 3:
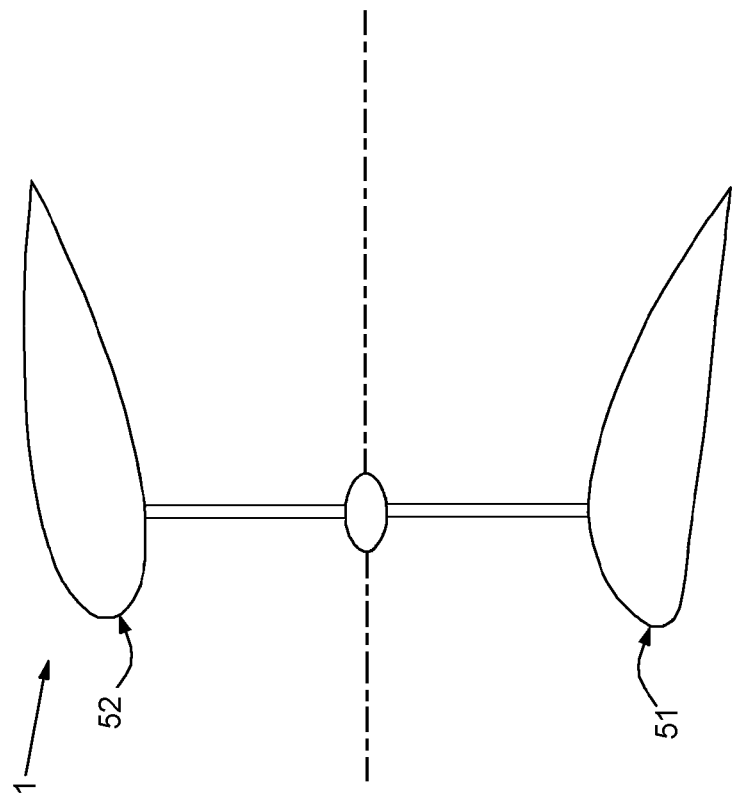
FIG. 3 is a vertical cross-sectional view of the exemplary shroud of FIG. 2.

The drag force on shroud 1 will increase parabolically as the wind speed increases, and such additional force will tend to lower the height of the shroud 1. Compensation against this drag force is provided for by an equivalent increase in lift force, and to this end shroud 1 is, in one embodiment, shaped to provide additional lift force through positive net aerodynamic lift produced by utilization of high local lift airfoils proximate the bottom 51 (relative to the base station) of shroud 1 and low local lift airfoils proximate the top 52 (relative to the base station) of shroud 1 (see also FIG. 3). Consistent with aerodynamic principles, these airfoil sections are adapted to produce high or low lift through any combination of high or low lift coefficients, and larger or smaller local chord lengths or angles of attack.

Figure 4:
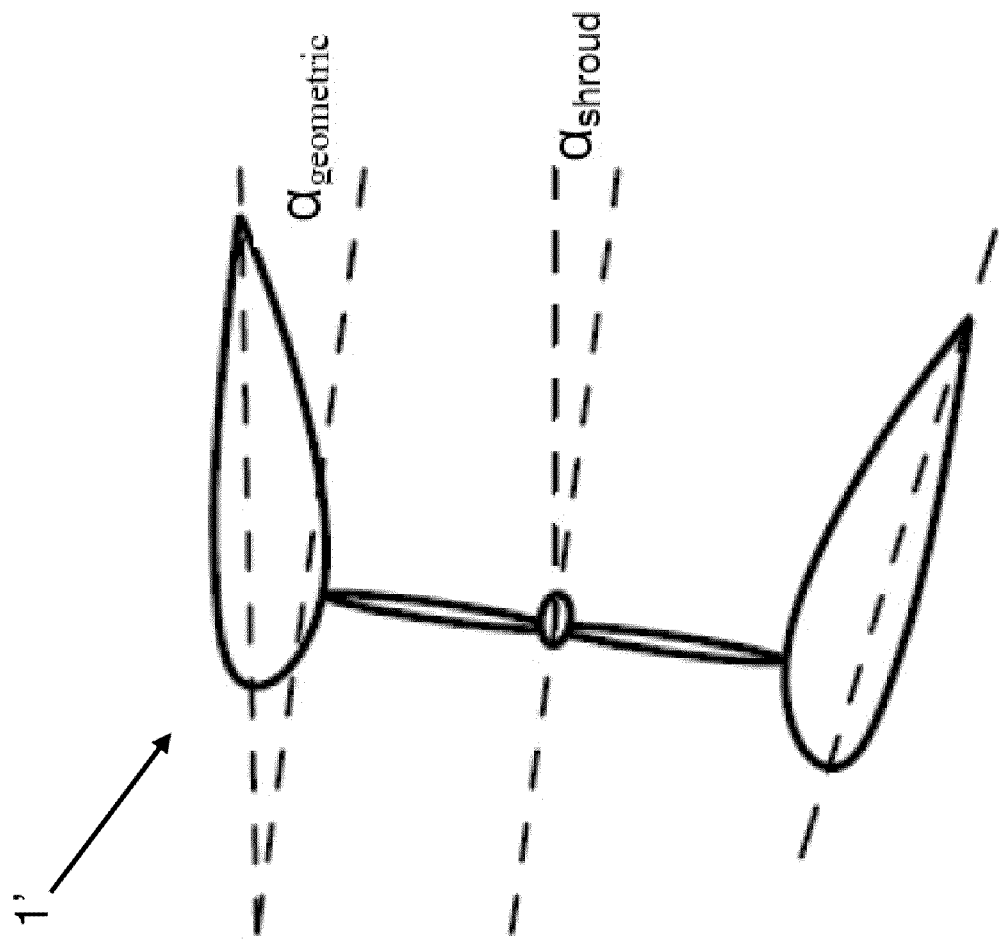
FIG. 4 is a diagrammatic vertical cross-sectional depiction of an exemplary shroud according to a further embodiment of the present invention.
Figure 5:
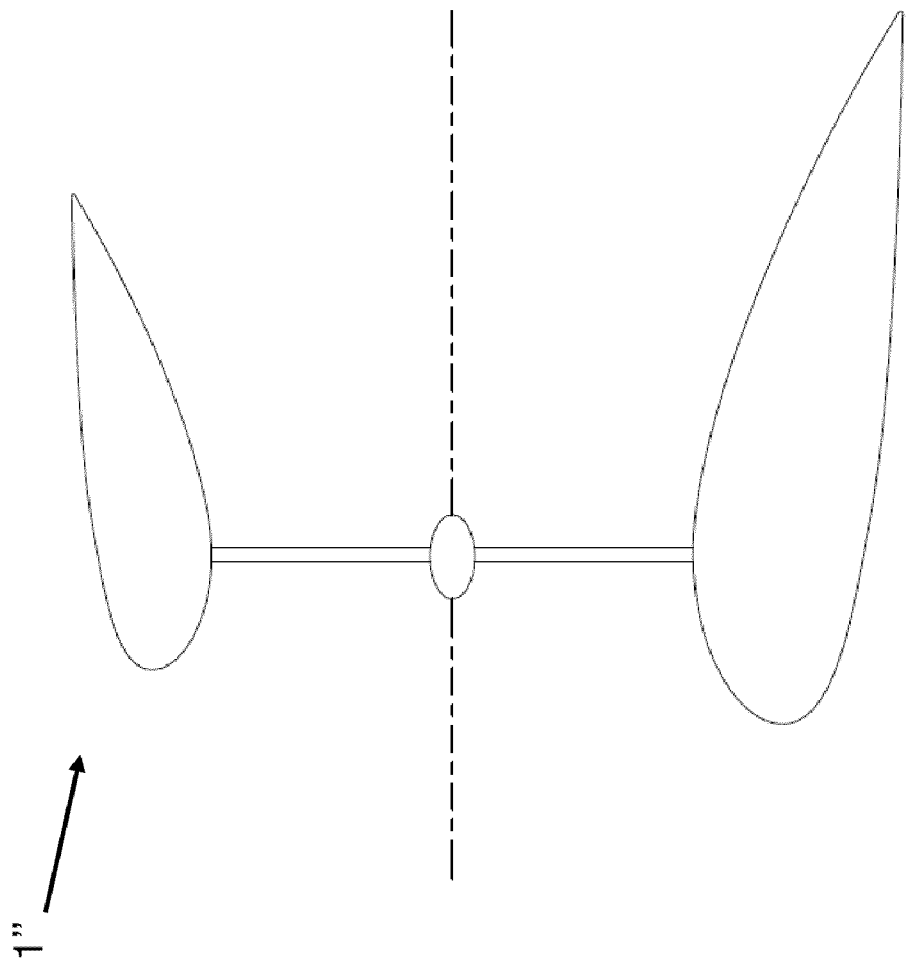
FIG. 5 is a diagrammatic vertical cross-sectional depiction of an exemplary shroud according to a still further embodiment of the present invention.

In addition, or alternatively, to the higher coefficient-of-lift airfoil sections at the bottom of shroud 1, the shroud may be configured to operate at a positive angle of attack ($\alpha_{shroud}$) (FIG. 4), and/or to employ larger airfoil sections at the bottom relative to those at top (FIG. 5).

Means may be provided to dynamically control the angle of attack of the shroud ($\alpha_{shroud}$) to provide lower or higher lift as necessary through, by way of non-limiting example, dynamic lengthening and shortening of the fore F and/or aft A attachment point harness lines. Such means may, for instance, comprise one or more mechanical winches disposed, for instance, at the juncture 12 where tether 11 comprises the separate lines extending to the fore F and/or aft A attachment points. According to this embodiment, each such winch is operative to selectively shorten the length of the associated line extending to one or more of the fore F and/or aft A attachment points. Alternatively, such means may be provided at or proximate the base station, according to which embodiment it will be appreciated that tether would comprise a plurality of separate lines extending between the base station and each of the fore F and/or aft A attachment points.

Figure 6:
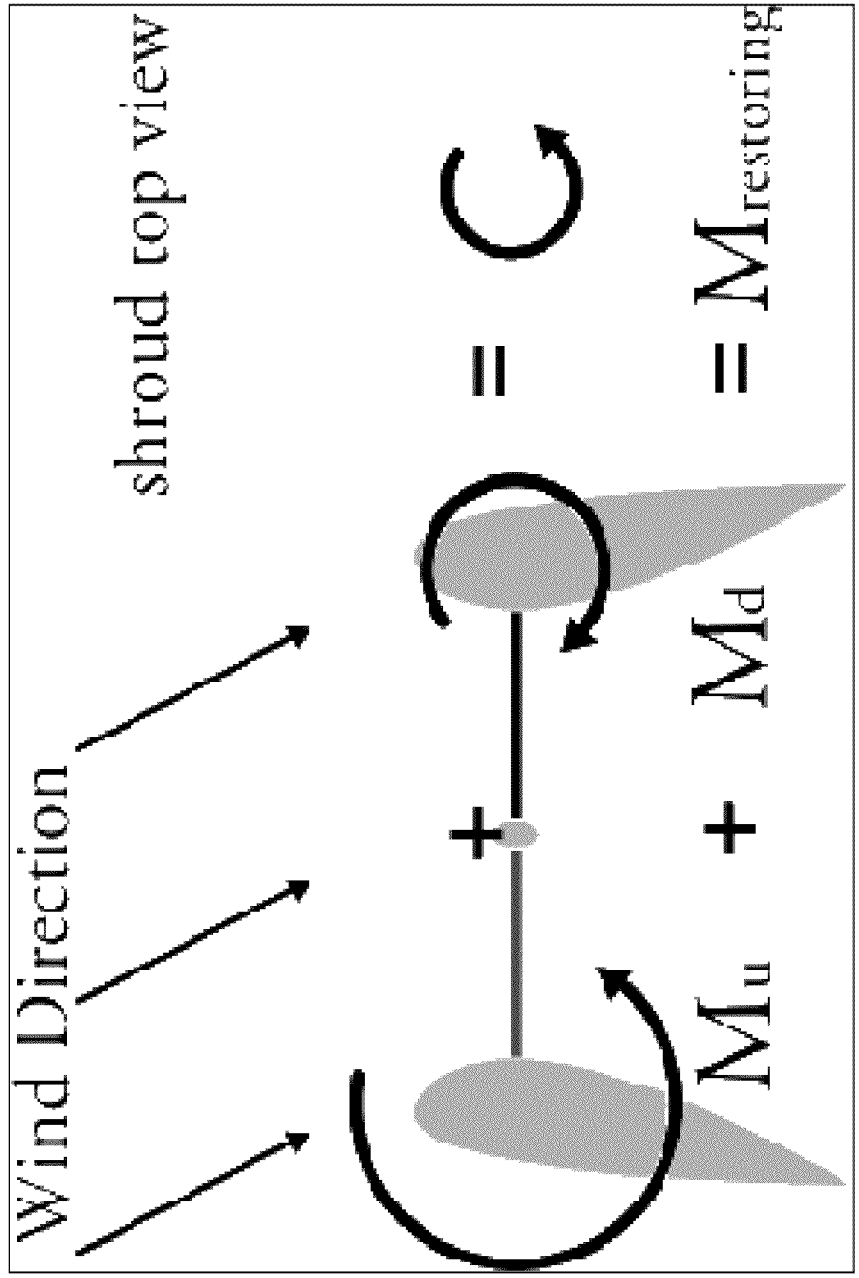
FIG. 6 is a diagrammatic horizontal cross-sectional depiction of the inventive shroud illustrating the principle of operation of the shroud configuration producing the asymmetric moment of left and right lateral sections thereof.

Referring to FIGS. 2 and 6, shroud 1 is configured to produce an asymmetric moment of left and right lateral sections thereof, which asymmetric moment yields a restoring moment that automatically orients the longitudinal axis of shroud 1 (defined along the centerline through stream tube 3) substantially optimally relative to the prevailing wind direction. This is particularly beneficial for higher frequency variations in wind direction, as the shroud 1 will passively "weather-vane" about the base station 10 in conditions of low frequency variations in wind direction. Generally speaking, this restoring moment is produced by the asymmetric moment of the left and right shroud sections, which are operating at different "angles of attack" when shroud 1 is yawed with respect to the prevailing wind direction. More particularly, the airfoil sections of shroud 1 are, in the exemplary embodiment of the invention, shaped such as to produce a "locally nose-down" moment about the airfoil quarter-chord. In the event of a non-zero yaw angle ($\theta_{yaw} \neq 0$), such as occurs when wind direction shifts, the upwind shroud sections operate at a local angle of attack, $\alpha_{upwind} = \alpha_{geometric} + \theta_{yaw}$, which is greater than the downwind shroud sections angle of attack, $\alpha_{downwind} = \alpha_{geometric} - \theta_{yaw}$, and subsequently the upwind shroud sections produce a larger "locally nose-down" moment ($M_u$), than the downwind shroud sections ($M_d$). This asymmetric aerodynamic moment sums to produce a net restoring moment ($M_{restoring}$) that points shroud 1 in the direction of the wind.

It will be understood from the foregoing disclosure that the asymmetric moment described above can be tailored to ensure an appropriate response to wind variations by employing airfoils with higher or lower moment coefficient.

While the disclosure heretofore has comprehended a shroud for an airborne wind-turbine, it is contemplated that the inventive shroud may, with only modest modification from the foregoing disclosure, be employed in an underwater environment as part of a water-turbine. According to such an alternative embodiment, the power-augmenting shroud and associated, enshrouded water turbine may be secured to a suitable base, such as, for instance, a tether or tower, whereby the shroud is permitted to pivot in the water so as to automatically orient itself substantially optimally relative to a prevailing water direction.

As with the embodiment of the shroud described above for employment in a wind-turbine system, the shroud according to this embodiment of the invention is likewise configured to produce rotation about an axis of rotation upstream of the center of pressure and substantially perpendicular to the longitudinal axis of the shroud, so as to automatically orient the longitudinal axis of the shroud substantially optimally relative to a prevailing water direction.

Unlike the embodiment of the invention for airborne employment, however, it will be appreciated that the underwater variant is not necessarily filled with a "lighter-than-air" gas, although buoyancy of the shroud (including in combination with any enshrouded turbine components) is required where the shroud is tethered to a base station. This is to be contrasted to embodiments where the shroud is pivotally connected to a rigid tower secured to the underwater floor or other substrate, in which case buoyancy of the shroud is plainly not required. Further according to such embodiments, it will likewise be appreciated that changes on the shroud's angle-of-attack can be effected by means other than fore and aft tether attachment points such as heretofore described.

Likewise, it will be appreciated that the dimensions and other exemplary measurements, such as airfoil sectional thicknesses, chord/radius ratio, etc. provided as non-limiting examples of the above-disclosed embodiment of the airborne variant of the inventive shroud are not necessarily applicable to the underwater embodiment, the dimensions and other measurements of which can be varied according to specific applications.

In view of the foregoing disclosure, it will be understood that configurations other than as described may be readily adopted. The foregoing description of the exemplary embodiment of the invention has been presented for purposes of illustration and description. It is not intended to be exhaustive of, or to limit, the invention to the precise form disclosed, and modification and variations are possible in light of the above teachings or may be acquired from practice of the invention. The embodiment shown and described in order to explain the principles of the invention in various embodiments and with various modifications as are suited to the particular application contemplated. Accordingly, all such modifications and embodiments are intended to be included within the scope of the invention. Other substitutions, modifications, changes and omissions may be made in the design, operating conditions, and arrangement of the exemplary embodiments without departing from the spirit of the present invention.

The invention in which an exclusive property or privilege is claimed is defined as follows:

1. A wind-based power generating system comprising:
    a wind turbine for converting wind energy into another form of energy; and
    a shroud, forming a ring around the wind turbine, configured to produce a positive net lift to the wind turbine, the net lift including a net aerodynamic lift and a net buoyant lift,
    wherein the shroud defines an interior volume for containing a lighter-than-air gas, and
    wherein the shroud has a ring-like shape, the ring-like shape having a cross-sectional shape about a perimeter of the ring-like shape at least in part configured as an airfoil, and
    wherein the cross-sectional shape is constructed and arranged to generate an asymmetric aerodynamic moment with respect to at least two different locations about the perimeter of the ring-like shape.

2. The wind-based power generating system according to claim 1, wherein the shroud defines a top section and a bottom section, wherein the top section includes a top local lift airfoil arrangement with lift vector oriented substantially upwardly and the bottom section includes a bottom local lift airfoil arrangement with lift vector oriented substantially upwardly.

3. The wind-based power generating system according to claim 1 wherein the shroud includes aerodynamic structures constructed and arranged to, at least one of, stabilize and control the shroud in the wind.

4. The wind-based power generating system according to claim 3, wherein the aerodynamic structures comprise fins attached to the shroud.

5. The wind-based power generating system according to claim 3, wherein the aerodynamic structures comprise wings attached to the shroud.

6. The wind-based power generating system according to claim 5, wherein the wings are configured to provide additional lift.

7. The wind-based power generating system according to claim 5, wherein the shroud includes a left section and a right section, and at least one attachment point for the tether located respectively on each of the left section and the right section.

8. The wind-based power generating system according to claim 1, wherein the wind-based power generating system includes a tether, configured to be attached between the ground and shroud, the tether configured to be extended and retracted to raise and lower the shroud and wind turbine to a predetermined altitude with respect to the ground.

9. The wind-based power generating system according to claim 8, wherein the shroud includes a fore section and an aft section, and at least one attachment point for the tether on each of the fore and aft sections.

10. The wind-based power generating system according to claim 9, wherein the shroud has a center of buoyancy and a center of gravity, wherein the center of buoyancy and the center of gravity are both located between the at least one attachment point in the fore section and the at least one attachment point in the aft section of the shroud.

11. The wind-based power generating system according to claim 10, wherein the wind-based power generating system is constructed and arranged to dynamically control an angle of attack of the shroud to provide each of lower and higher lift based on dynamic lengthening and shortening of a respective point harness line on the attachment point of each of the fore section and the aft section.

12. The wind-based power generating system according to claim 1, wherein the shroud defines a captured stream tube having a downstream-tapered internal dimension located substantially on a portion thereof downstream of the wind turbine so as to augment wind turbine power generation.

13. A wind-based power generating system comprising:
a wind turbine for converting wind energy into another form of energy; and
a shroud, forming a ring around the wind turbine, configured to produce a positive net lift to the wind turbine, the net lift including a net aerodynamic lift and a net buoyant lift,
wherein the shroud defines an interior volume for containing a lighter-than-air gas, and
wherein the shroud has a ring-like shape, the ring-like shape having a cross-sectional shape about a perimeter thereof at least in part configured as an airfoil, and
wherein the shroud defines a top section and a bottom section, wherein the top section of the shroud has a different cross-sectional area relative to the bottom section of the shroud.

14. The wind-based power generating system according to claim 13, wherein the net buoyant lift is distributed asymmetrically between the top section and the bottom section of the shroud.

15. The wind-based power generating system according to claim 13 wherein the net aerodynamic lift is distributed asymmetrically between the top section and the bottom section of the shroud.

16. The wind-based power generating system according to claim 13, wherein the top section is configured to have a different angle of attack relative to the bottom section.

17. A wind-based power generating system comprising:
a wind turbine for converting wind energy into another form of energy; and
a shroud, forming a ring around the wind turbine, configured to produce a positive net lift to the wind turbine, the net lift including a net aerodynamic lift and a net buoyant lift,
wherein the shroud defines an interior volume for containing a lighter-than-air gas, and
wherein the shroud has a ring-like shape, the ring-like shape having a cross-sectional shape about a perimeter thereof at least in part configured as an airfoil, and
wherein the shroud defines a top airfoil section and a bottom airfoil section, the top airfoil section having a different chord length relative to the bottom airfoil section.

18. A shroud for use in converting wind-based airflow into electrical energy, comprising:
a shroud wall defining an enclosed volume that contains a lighter-than air gas, wherein the shroud wall has an upper section and a lower section, the upper section having a cross-sectional shape which is different from the lower section with respect to the centerline so as to generate a positive aerodynamic lift thereby;
a plurality of attachment sections constructed and arranged to interconnect the shroud wall to a tether; and
a plurality of attachment sections on the shroud wall facing the enclosed volume constructed and arranged to support a wind turbine mounted within the enclosed volume.

19. The wind-based power generating system according to claim 18, wherein the shroud wall defines a captured stream tube having a downstream-tapered internal dimension located substantially on a portion thereof downstream of the wind turbine so as to augment wind turbine power generation.

* * * * *